United States Patent [19]

Kogure

[11] Patent Number: 5,247,674
[45] Date of Patent: Sep. 21, 1993

[54] STATIC MEMORY ALLOCATION SYSTEM

[75] Inventor: Masayuki Kogure, Sagamihara, Japan

[73] Assignee: Fujitsu Limited, Kawasaki, Japan

[21] Appl. No.: 698,852

[22] Filed: May 13, 1991

[30] Foreign Application Priority Data

May 11, 1990 [JP] Japan .................. 2-121757

[51] Int. Cl.⁵ .......................................... G06F 12/02
[52] U.S. Cl. .......................... 395/650; 364/DIG. 1; 364/281.6; 364/281.4; 364/231.6
[58] Field of Search ............... 364/DIG. 1, DIG. 2; 395/650, 425

[56] References Cited

U.S. PATENT DOCUMENTS

| | | | |
|---|---|---|---|
| 4,592,011 | 5/1986 | Mantellina et al. | 364/DIG. 2 |
| 4,754,394 | 6/1988 | Brantley, Jr. et al. | 364/DIG. 1 |
| 4,860,252 | 8/1989 | Sykora | 364/DIG. 2 |
| 4,989,137 | 1/1991 | Oxley et al. | 364/DIG. 1 |

Primary Examiner—Thomas M. Heckler
Attorney, Agent, or Firm—Staas & Halsey

[57] ABSTRACT

A memory allocation system includes a unit for storing the information about the amount of memory required at the time of initializing each executable program in the control information of the file storing the program. The amount required is determined when the program is translated, assembled or compiled and linked. The memory allocation system also includes a unit for reading the information, indicating the amount of memory required at the time of initializing the program stored in the control information of the file, when loading of program is requested. Also included are a unit statically allocates memory commensurate with the amount of memory required at initialization and a unit for dynamically allocating memory when the previously allocated memory is insufficient for executing the program.

17 Claims, 9 Drawing Sheets

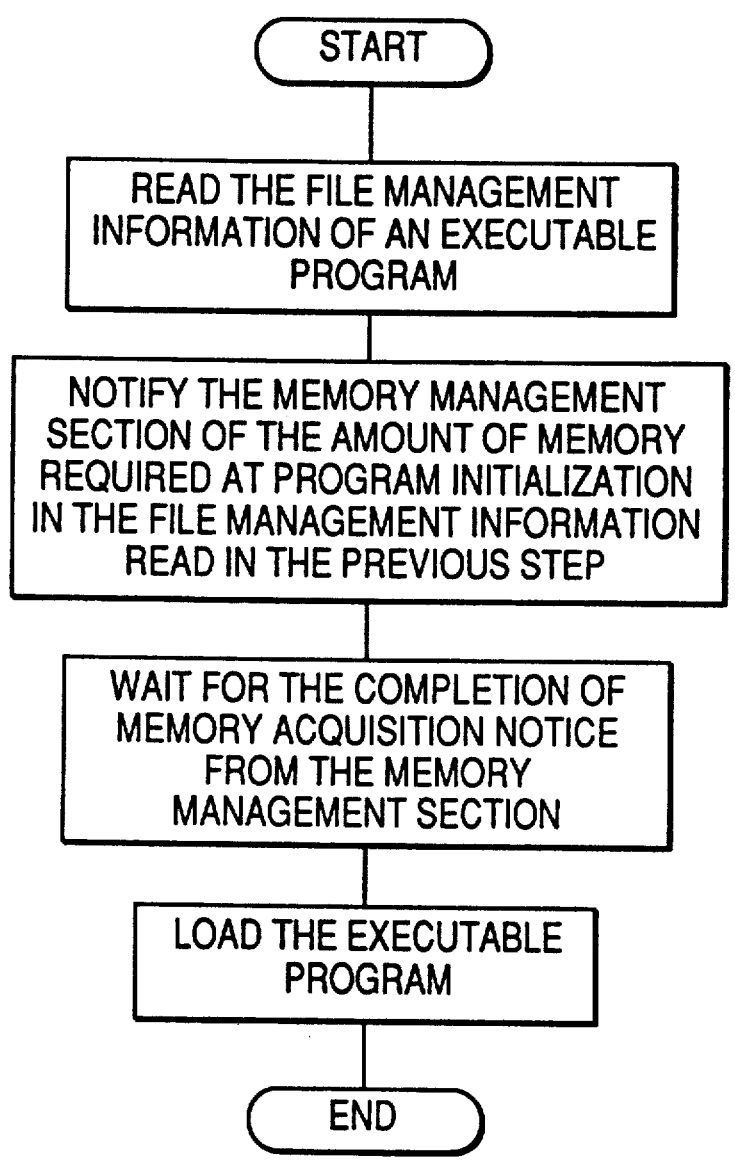

STATIC MEMORY ALLOCATION SYSTEM

BACKGROUND OF THE INVENTION

1. Field of the Invention

This invention pertains to a system for statically allocating a memory for use in a computer system capable of efficiently allocating a memory necessary for executing FORTRAN programs, etc.

A super computer for high speed program execution using pipeline processing or parallel processing requires that a program and the entire data referred to by the program be stored in its memory during the program execution. An efficient memory allocation technique is therefore sought.

2. Description of the Related Art

When a user program for scientific or technological calculations is run, if the memory for storing the program and the necessary data are deficient, it is necessary to interrupt the operation of other programs being executed to make additional memory available by swapping out the interrupted program onto an external memory device.

However, the volume of data handled by a super computer is generally huge and an overhead caused by the swapping is more severe than that caused by such swapping in a general-purpose computer. Also, since a super computer is expected to provide high speed performance, the overhead caused by the swapping must be avoided in every way possible.

A static memory allocation method is effective in preventing the overhead caused by such swapping, whereby the maximum memory volume deemed necessary for executing a program to be run is allocated in advance and the memory is kept allocated until the program execution is ended.

Since this method allows programs to be executed with the necessary memory already allocated beforehand, no memory deficiency occurs while the programs are being executed, and the overhead produced by swapping can be avoided. However, since the memory is kept allocated, the memory usage efficiencies are lowered.

On the other hand, a dynamic memory allocation method is defined as a method whereby requested memory is allocated only when a memory request is made, thus generally creating no idle portions of memory. Yet, since overhead produced by swapping cannot be avoided when multiple programs are run concurrently, it is not effective to apply this method to a super computer system.

FIG. 1 shows an example of the prior art for static memory allocation.

Generally, a user specifies the memory volume kept allocated by job control statements 21 using a conventional static memory allocation method.

The following is a description of a memory allocation method of the prior art by referring to the steps [1] through [6] shown in FIG. 1.

1 A job management section 22 interprets the specification on the volume of memory allocation described in the job control statement 21.

2 The job management section 22 notifies a memory management section 15 of the interpreted volume of memory allocation.

3 The memory management section 15 allocates the specified volume of memory 23.

4 The memory management section 15 notifies the job management section 22 of the completion of allocating the memory 23.

5 The job management section 22 calls up a loader 14 when the environment for executing the job is complete.

6 The loader 14 loads an executable program 13 into the memory 23.

After the loading, the program is initialized and the program execution begins.

A user needs to precisely estimate the memory volume necessary for program execution for an efficient memory allocation, when he utilizes the conventional static memory allocation method.

However, it is difficult to correctly estimate the memory volume necessary for the program execution. Because the precise estimation is difficult, in order to avoid abnormally terminating a program execution because of a memory deficiency, the user often specifies a memory volume larger than necessary. Therefore, less of the memory allocated for the program is actually used and the memory usage efficiency tends to be lowered.

FIG. 2 shows an example of a time series change in the memory volume allocated for a program using the conventional static memory allocation.

In FIG. 2, the part with slashes indicates the actually used memory volume. However, the memory volume specified by a user is kept allocated to the program from where the program execution is requested until the program execution is completed irrespective of the actually used volume. This causes an increase in the volume of idle memory, which could have been allocated for other programs running concurrently, resulting in a decrease in the number of jobs which can be executed simultaneously.

SUMMARY OF THE INVENTION

This invention aims at reducing the users' workloads where estimating the memory volume necessary for program execution and preventing memory wastage by unnecessary memory allocation.

This invention pertains to a system for statically allocating a memory for use in a computer system capable of efficiently allocating a memory necessary for executing FORTRAN programs, etc.

This invention configures a system made up of a unit for storing information on a memory volume necessary for initializing an execution format program in the management information section of the file for storing the program by obtaining the necessary memory volume when the program is translated, assembled or compiled, a unit for reading the information about the memory volume required at the time of initializing the program stored in the management information section of the file, when the execution format program is loaded, a unit for statically allocating a memory commensurate with the read memory volume; and a unit for dynamically allocating a memory, when the memory is deficient for the program execution.

BRIEF DESCRIPTION OF THE DRAWINGS

FIG. 7 is a flowchart illustrating the operation of a loader; and

DESCRIPTION OF THE PREFERRED EMBODIMENT

Figure 1:
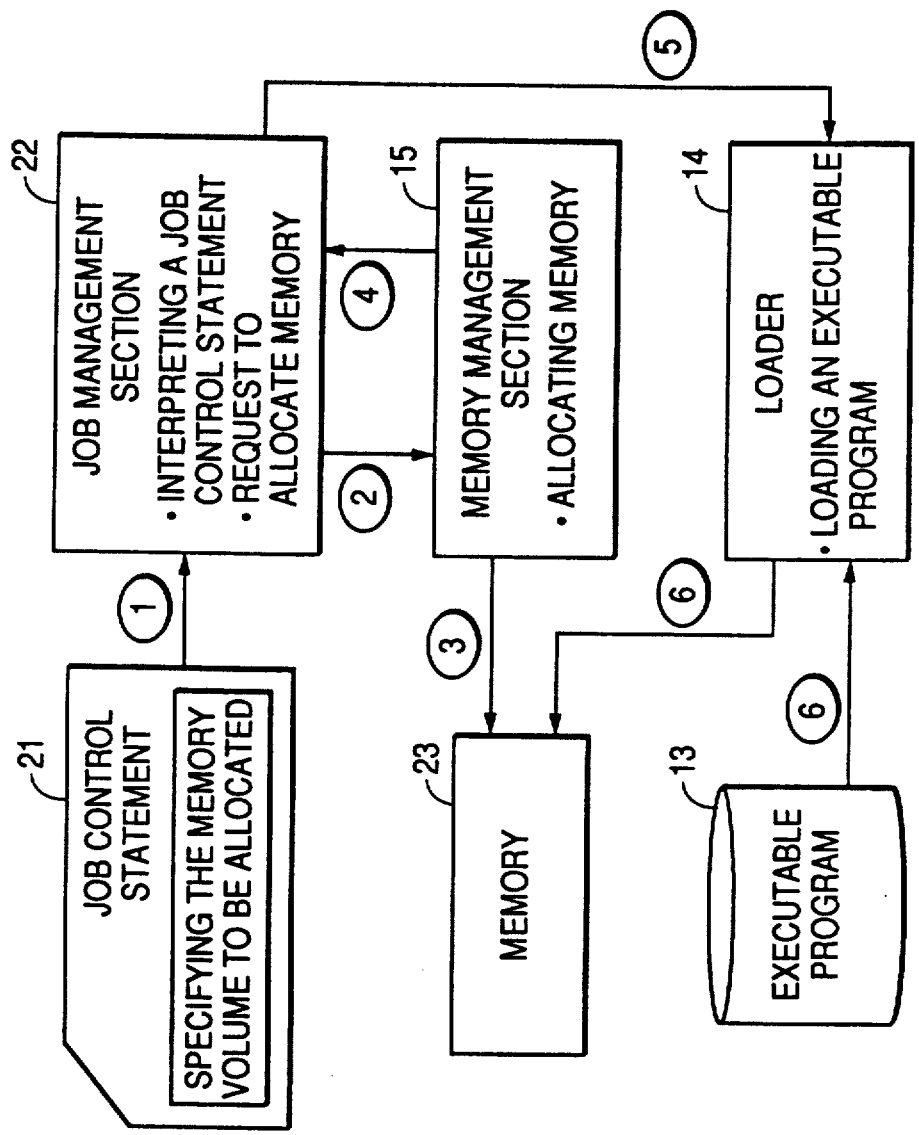
FIG. 1 is a block diagram of an example of the prior art for static memory allocation.
Figure 2:
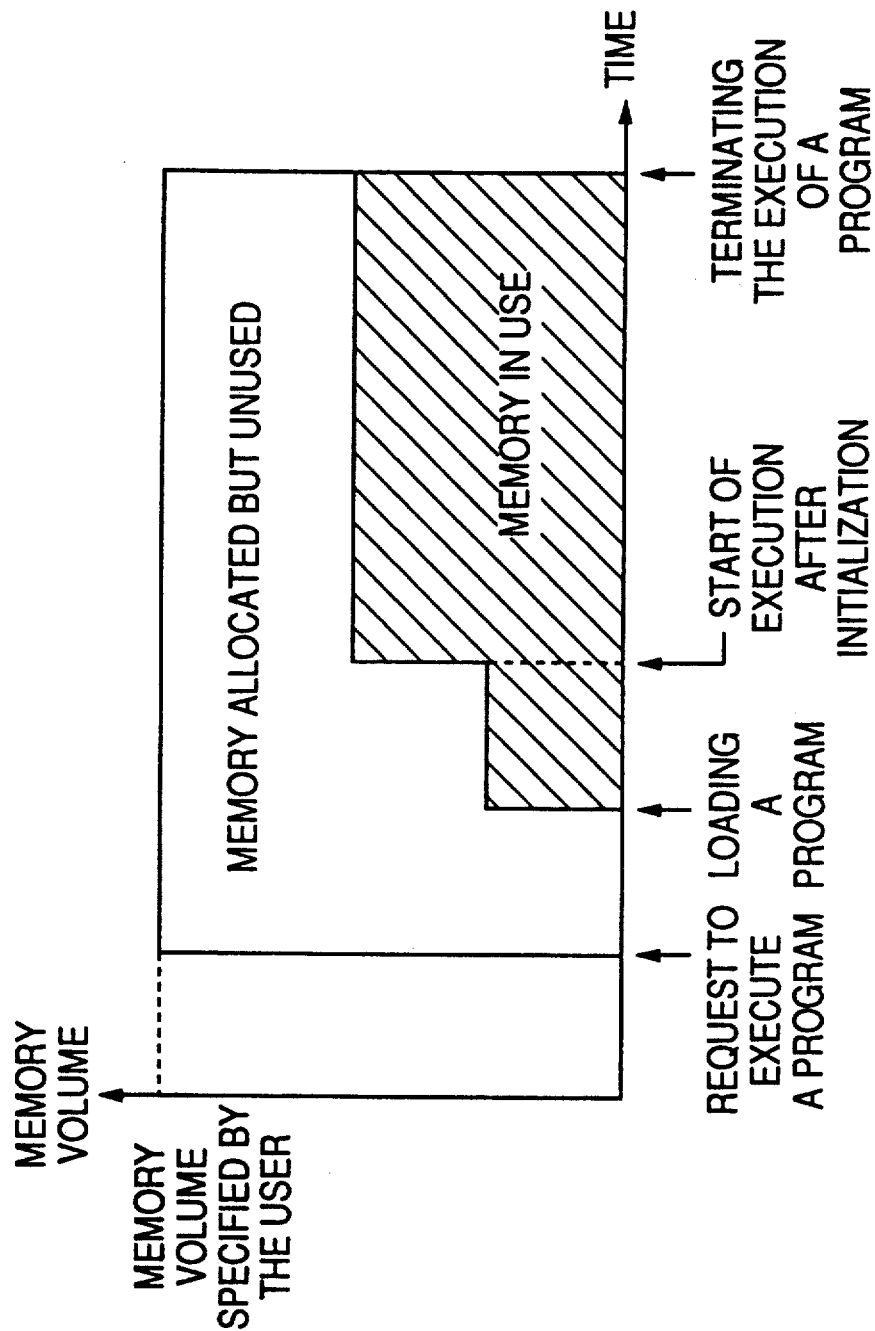
FIG. 2 is a diagram of an exemplary state of memory allocation according to the prior art.
Figure 3:
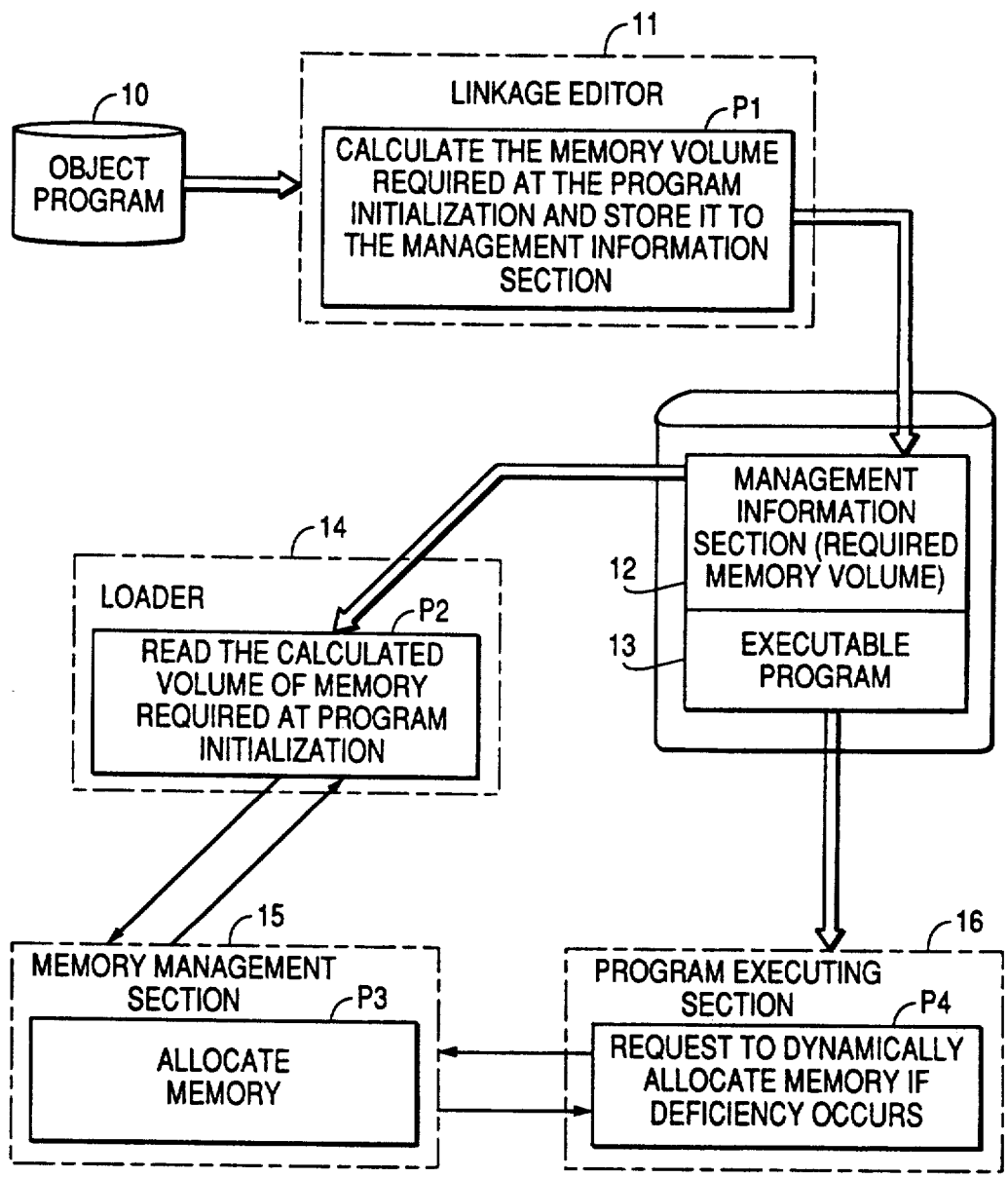
FIG. 3 is a block diagram of a principle of this invention.

FIG. 3 is a block diagram designating a principle of the present invention.

In FIG. 3, 10 is an object program previously translated from a source program into a machine language command level, 11 is an linkage editor for creating an executable program by compiling and linking a program, 12 is a management information section for storing management information on an executable program, 13 is an executable program, 14 is a loader for loading an executable program into a memory, 15 is a memory management section for allocating a memory in response to a memory allocation request by controlling an actual memory not being used, and 16 is a program executor for executing an executable program.

This invention assumes that the information management section 12 of a file storing the executable program 13 has storage spaces for the amount of memory required at a program initialization.

In a processing step P1, while a compiler and the linkage editor 11 translates, assembles or and links a program, the management information section 12 stores the information about an amount of memory necessary for initializing the program, which takes account of the amount of memory to be used by the program.

In a processing step P2, the loader 14 reads the information on the amount of memory necessary for initializing the program stored in the management information section 12 and notifies the memory management section 15 of the amount of memory, when it loads the executable program 13.

In a processing step P3, the memory management section 15 statically allocates the memory according to the notified memory amount.

In a processing step P4, if the program executor 16 encounters a memory deficiency while it executes a program, the program executor 16 requests the memory management section 15 to allocate the deficiency in memory and the memory management section 15 dynamically allocates the requested memory.

A feature of this invention resides in a combined use of a static memory allocation based on program information notified from a compiler and a linkage editor and a dynamic memory allocation when the statically allocated memory is deficient, which eliminates the need for having a user specify the amount of memory to be used. To be specific, the memory allocated is defined here as a memory space, where an actual memory corresponds on a one-to-one basis with a virtual memory.

In other words, the prior art requires that a user specifies the amount of memory to be allocated by a job control statement, and a job management section requests the memory management section 15 to allocate memory, when the job management section receives a request for executing a program.

On the other hand, this invention enables the loader 14 to request an allocation of a necessary amount of memory to the memory management section 15 immediately before it loads a program, based on the program information stored in the management information section 12.

If the amount of allocated memory turns out to be deficient during a program execution, the prior art method of statically allocating a memory only causes an abnormal termination of the program execution, but the method of this invention prevents such an abnormal termination, because it also allocates memory dynamically.

There is a risk that the dynamic memory allocation causes overhead due to a swapping. But for the following reasons, memory deficiency during program execution is considered rare, and an overhead due to a swapping is not much of a problem.

(a) Most programs a super computer system runs are written in FORTRAN.

(b) FORTRAN programs have little change in memory usage after their initialization is completed.

For the above reasons (a) and (b), few programs a super computer runs substantially change their memory usage. Therefore, the additional use of dynamic memory allocation seldom causes an overhead because of memory competition.

Figure 4:
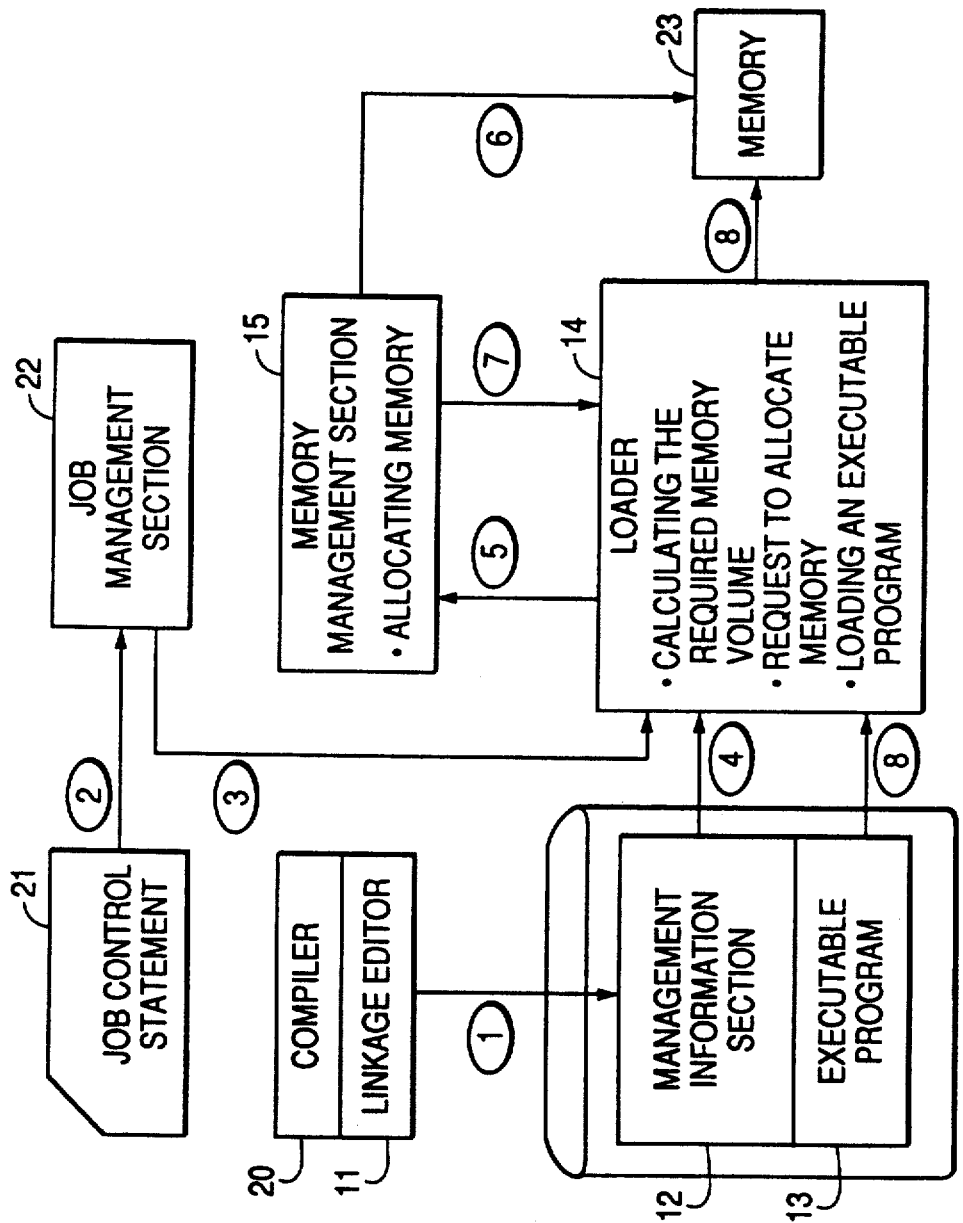
FIG. 4 is a block diagram of an embodiment of the present invention.
Figure 5:
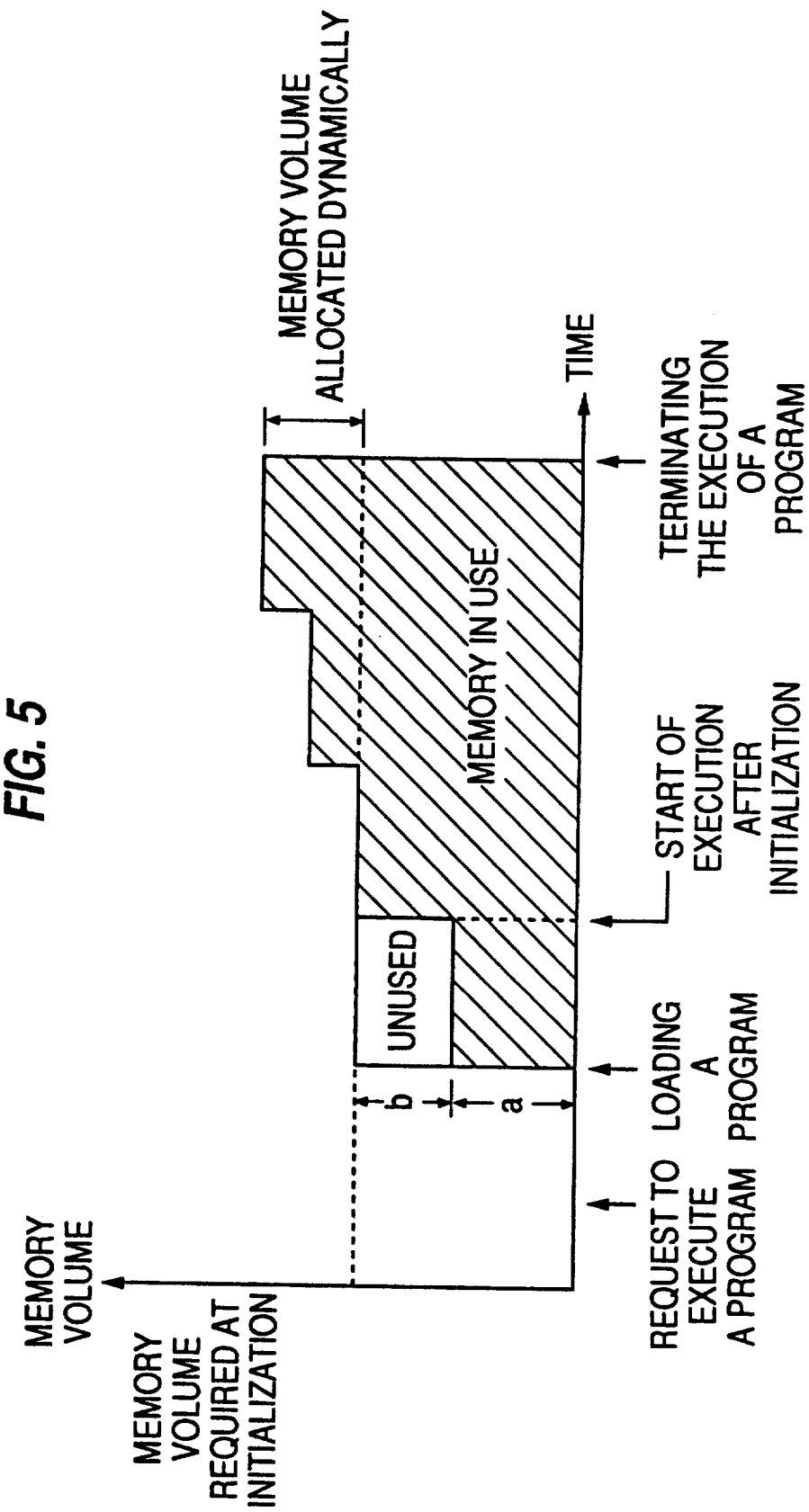
FIG. 5 is a diagram of an exemplary state of memory allocation in the embodiment of this invention.

FIG. 4 is an exemplary block diagram of an embodiment of this invention. FIG. 5 is a diagram of an exemplary state of memory allocation in the embodiment of this invention.

The actions of the static memory allocation according to an embodiment of this invention are explained by referring to [1] through [8] shown in FIG. 4.

1 A compiler 20 and the linkage editor 11 determine the amount of memory necessary for initializing a program and stores the amount in the management information section 12 before a translation, an assembly or a compilation.

2 The job control statements 22 requests a program execution by the job management section 22. The job control statements 21 do not have to specify the amount of memory allocated.

3 The job management section 22 interprets the job control statements 21 and sets up an environment for program execution except for the memory allocation. After the execution environment is complete, the job management section 22 requests loading by the loader 4.

4 The loader 14 reads the information on the amount of memory required at program initialization written in the management information section 12 of the file for the executable program 13.

5 The loader 14 notifies the memory management section 15 of the information on the read memory volume.

6 The memory management section 15 allocates the memory according to the necessary amount of memory based on the notification from the loader 14.

7 The memory management section 15 notifies the loader 14 of the completion of the memory allocation.

8 The loader 14 reads the executable program 13 and loads it into the allocated memory.

As described above, memory is allocated immediately before the loading of the programs, which are then initialized and their executions begin.

FIG. 5 shows an exemplary time series change of the amount of memory allocated for a program.

The job management section 22 does not allocate memory, when program execution is requested. Instead, it allocates memory in a batch according to the amount of memory required at program initialization, when the program is loaded. The reference character "a" shown in FIG. 5 indicates the size of the loaded executable program.

Upon program initialization, the necessary memory space is in a state of being used. The reference character "b" shown in FIG. 5 corresponds to the size of the data space.

After the program execution starts, if a memory is deficient, an additional memory is dynamically allocated. However, cases requiring a swapping operation in a dynamic memory allocation are rare.

Figure 6:
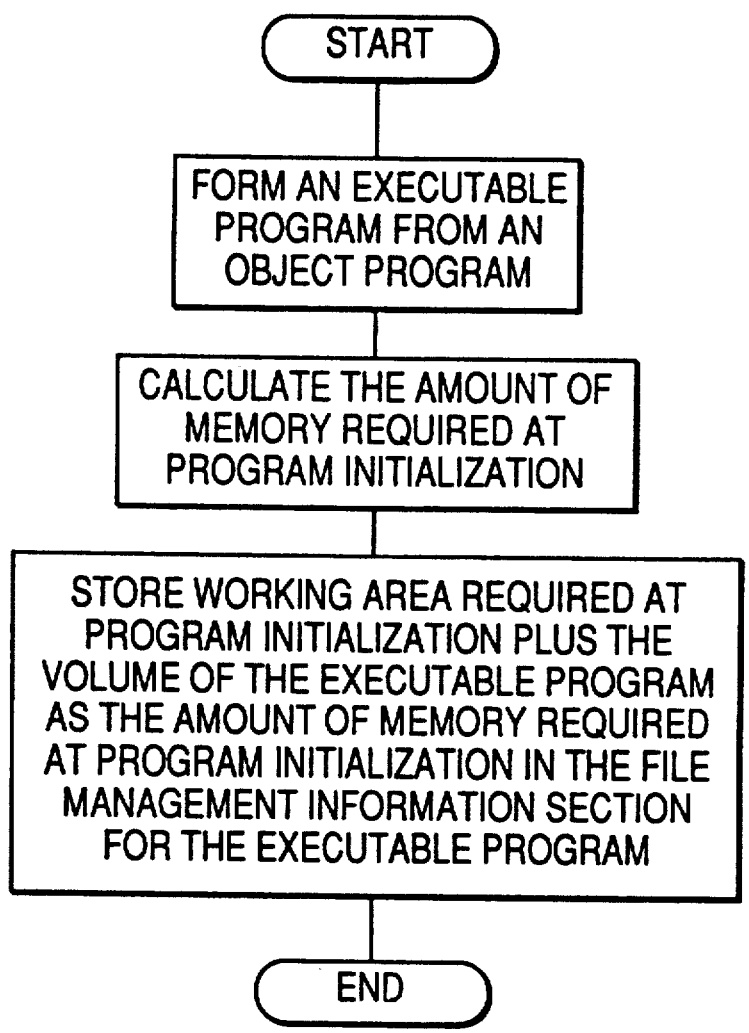
FIG. 6 is a flowchart illustrating the operation of a linkage editor.

FIG. 6 is a flowchart illustrating the operation of a linkage editor.

After the linkage editor begins its processes, it creates an executable program from an object program. Then, it calculates the amount of memory required at program initialization. Finally, it stores the size of the executable program as the amount of memory required at program initialization in the file management information section of the executable program, before it ends its processes.

FIG. 7 is a flowchart illustrating the operation of a loader.

After the loader begins its processes, it reads the file's management information section of the executable program. Next, it notifies the memory management section of the amount of memory required at program initialization in the information read from the file's management information section. Then, it waits for the notification from the memory management section regarding the completion of the memory acquisition. Finally, it loads the execution format program, before it ends its processes.

Figure 8A:
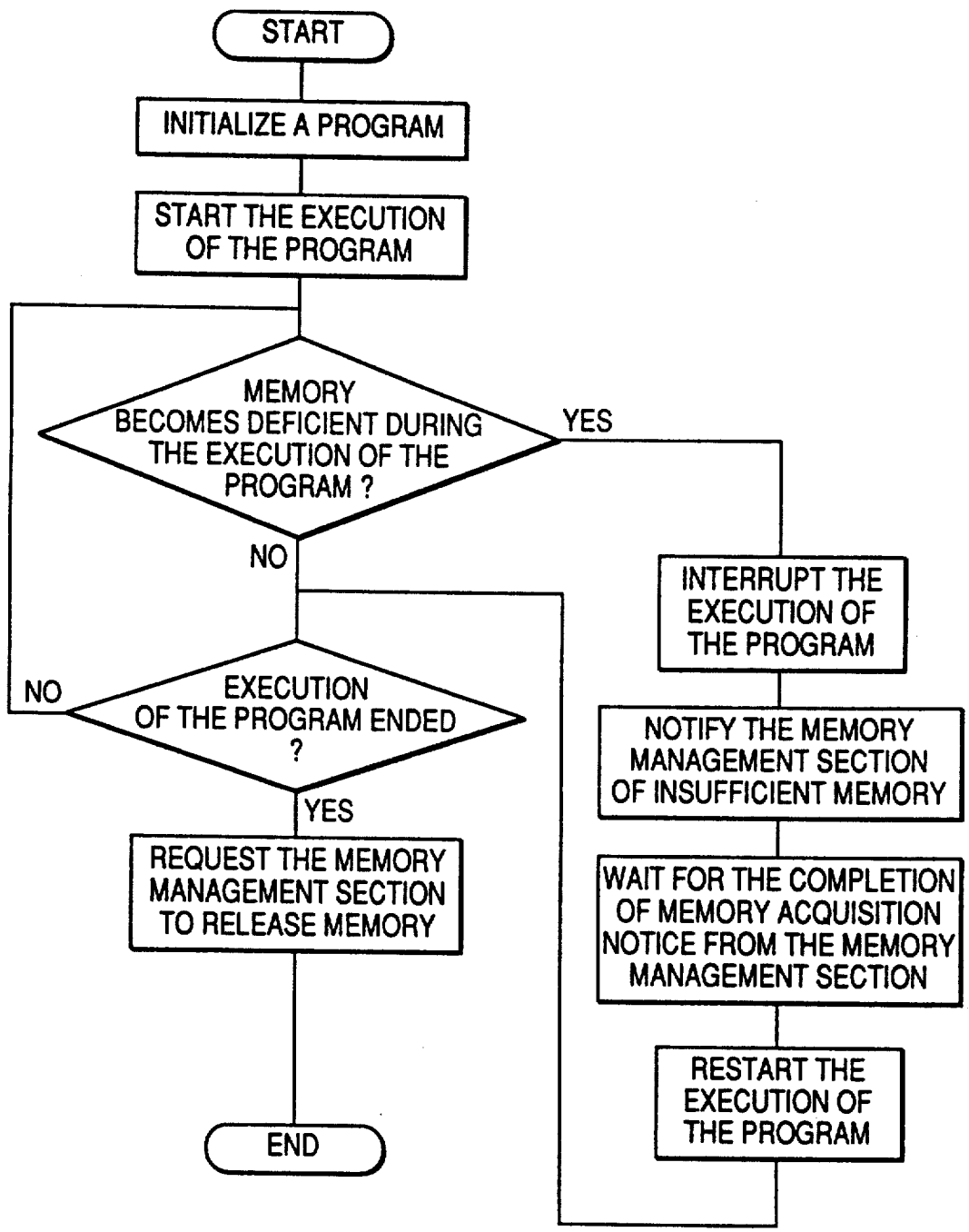
FIGS. 8A and 8B are flowcharts illustrating the operation of a program executor.

FIGS. 8A shows a flowchart illustrating the operation of a program executor.

After the program executor begins its processes, it initializes a program and starts executing the program. If the amount of memory is insufficient while it executes the program, it interrupts the program execution, notifies the memory management section of the insufficient memory, waits for the notification from the memory management section regarding the completion of the memory acquisition, and resumes executing the program. Unless the memory is insufficient, it continues the program execution. When the program execution is completed, it requests the memory management section to release the memory, before it ends its processes.

Figure 8B:
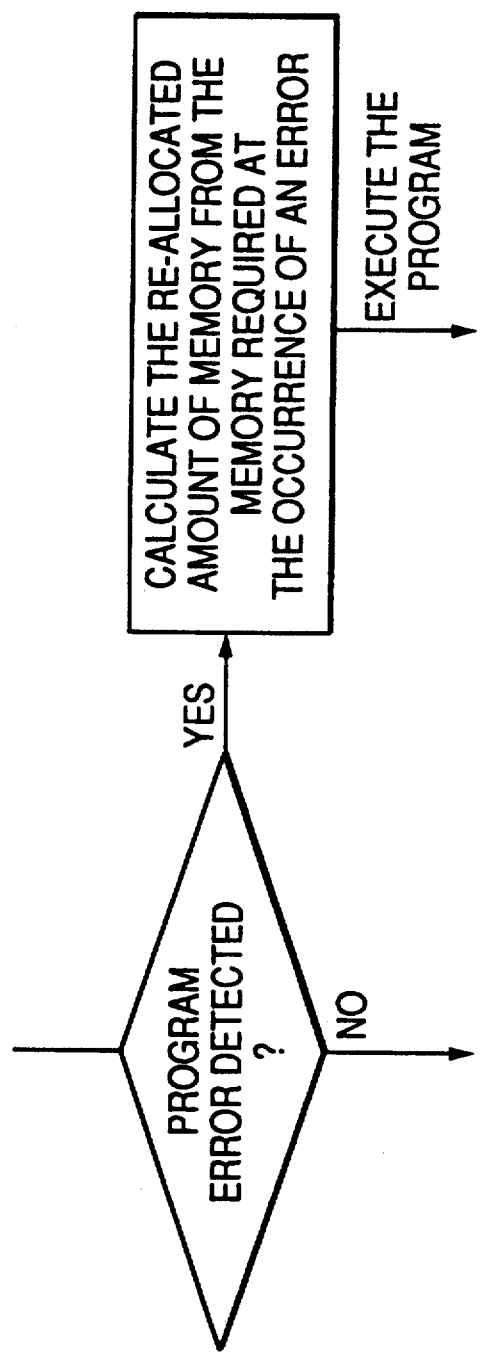

More specifically, the memory deficiency is diagnosed by program error detection as shown in FIG. 8B, and the amount of memory to be re-allocated is calculated from the amount of memory required at the occurrence of an error. Namely, the amount of memory acquired is obtained as the difference between the previously requested amount of memory and the amount of memory required.

As described above this invention does not require that a user precisely estimate the memory volume necessary for program execution. Since memory is not occupied more than necessary, it is used efficiently, and its throughput is increased. Since the overhead does not increase, the high speed performance, which is a feature of a super computer system, is not hindered. Since the memory is allocated immediately before a program is loaded, rather than when the program execution is requested, the time period during which memory is allocated becomes shorter.

What is claimed is:

1. A static memory allocation system for use in a computer system allocating memory for executing programs, said static memory allocation system comprising:

linkage editor means for storing information about an amount of memory required at initialization of an executable program, in a management information section of a file containing the executable program by obtaining the amount of memory required, when each program is translated, assembled or compiled to produce a corresponding executable program;

loader means for automatically loading the executable program into memory, for reading the information about the amount of memory required when the executable program is initialized, stored in the management information section of the file, when the executable program is loaded; and memory management section means for statically allocating the amount of memory indicated in the information read by said loader means is statically allocated memory for the executable program to be loaded into by said loader means.

2. The static memory allocation system according to claim 1, further comprising:

program executor means for dynamically allocating additional memory, when the statically allocated memory is insufficient during program execution.

3. The static memory allocation system according to claim 2, wherein said program executor means, after beginning processing, initializes and starts executing the executable program and in case of a memory deficiency during program execution, interrupts program execution, notifies said memory management section means of insufficient amount of memory and waits for notification from said memory management section means regarding completion of memory acquisition to resume executing the executable program; and otherwise, continues program execution until completion of program execution, when said program executor means requests said memory management section means to release all memory allocated to the executable program, before ending processing.

4. The static memory allocation system according to claim 3, wherein the memory deficiency is indicated by a program error and the amount of memory to be obtained by swapping out one or more other programs is determined by subtracting from the additional memory required, an amount of available empty memory.

5. The static memory allocation system according to claim 2, wherein the executable program has a size and requires a program work area, and wherein the statically allocated memory required at program initialization is determined by combining the size of the executable program and the program work area required at program initialization.

6. The static memory allocation system according to claim 2, wherein the executable program requires a program work area at program initialization with a size determined by description and definition of variables and constants in the executable program.

7. The static memory allocation system according to claim 2, wherein the executable program has a size determined by one of translation, assembly and compilation.

8. The static memory allocation system according to claim 2, wherein said program executor means detects that the memory is insufficient for executing the executable program when a current address reaches a maximum address of the statically allocated memory required at initialization of the executable program stored in the management information section of the file.

9. The static memory allocation system according to claim 2, wherein said program executor means dynamically allocates memory using any empty spaces of memory and any remaining deficiency in memory is obtained by swapping one or more executable programs to disk.

10. The static memory allocation system according to claim 2, wherein the executable program is written in FORTRAN.

11. The static memory allocation system according to claim 1, wherein said linkage editor means, after beginning processing, creates the executable program from an object program, calculates the amount of memory required at program initialization and stores the amount of memory required at program initialization in the management information section of the file for the executable program, before ending processing.

12. The static memory allocation system according to claim 1, wherein said loader means, after beginning processing, reads the management information section of the file for the executable program, notifies said memory management section means of the amount of memory required at program initialization stored in the information read from the management information section of the file, waits for notification from said memory management section means regarding completion of memory acquisition and then loads the executable program, before ending processing.

13. A static memory allocation method for use in a computer system allocating memory to executing programs, said static memory allocation method comprising:
(a) storing information on an amount of memory, necessary for initializing an executable program, in a management information section of a file storing the executable program after determining the amount of memory required, when the executable program is produced by being translated, assembled or compiled; and
(b) automatically loading the executable program, including reading the information on the amount of memory required at program initialization stored in the management information section of the file, statically allocating initial memory commensurate with the amount of memory read and loading the executable program into the initial memory allocated thereto.

14. The static memory allocation method according to claim 13, further comprising
(c) dynamically allocating additional memory, when the initial memory is insufficient for the executable program during execution thereof.

15. A method of allocating memory in a computer system to concurrently executing programs, comprising the steps of:
(a) automatically obtaining a program size and a work area size of an executable program when the executable program is produced from an object program; and
(b) statically allocating an amount of memory substantially equal to the program size plus the work area size of the executable program obtained in step (a), immediately before loading the executable program.

16. A method as recited in claim 15, further comprising the step of (c) dynamically allocating additional memory to the executable program as needed during execution thereof.

17. A method as recited in claim 15, further comprising the step of (c) storing the amount of memory in a memory management section of a file containing the executable program, between steps (a) and (b).

* * * * *